Feb. 6, 1934.    T. H. WILLIAMS    1,946,449
COLLAPSIBLE DRUM
Filed Oct. 24, 1932    6 Sheets-Sheet 2

INVENTOR
THOMAS H. WILLIAMS.
BY
Ely & Barrow
ATTORNEYS.

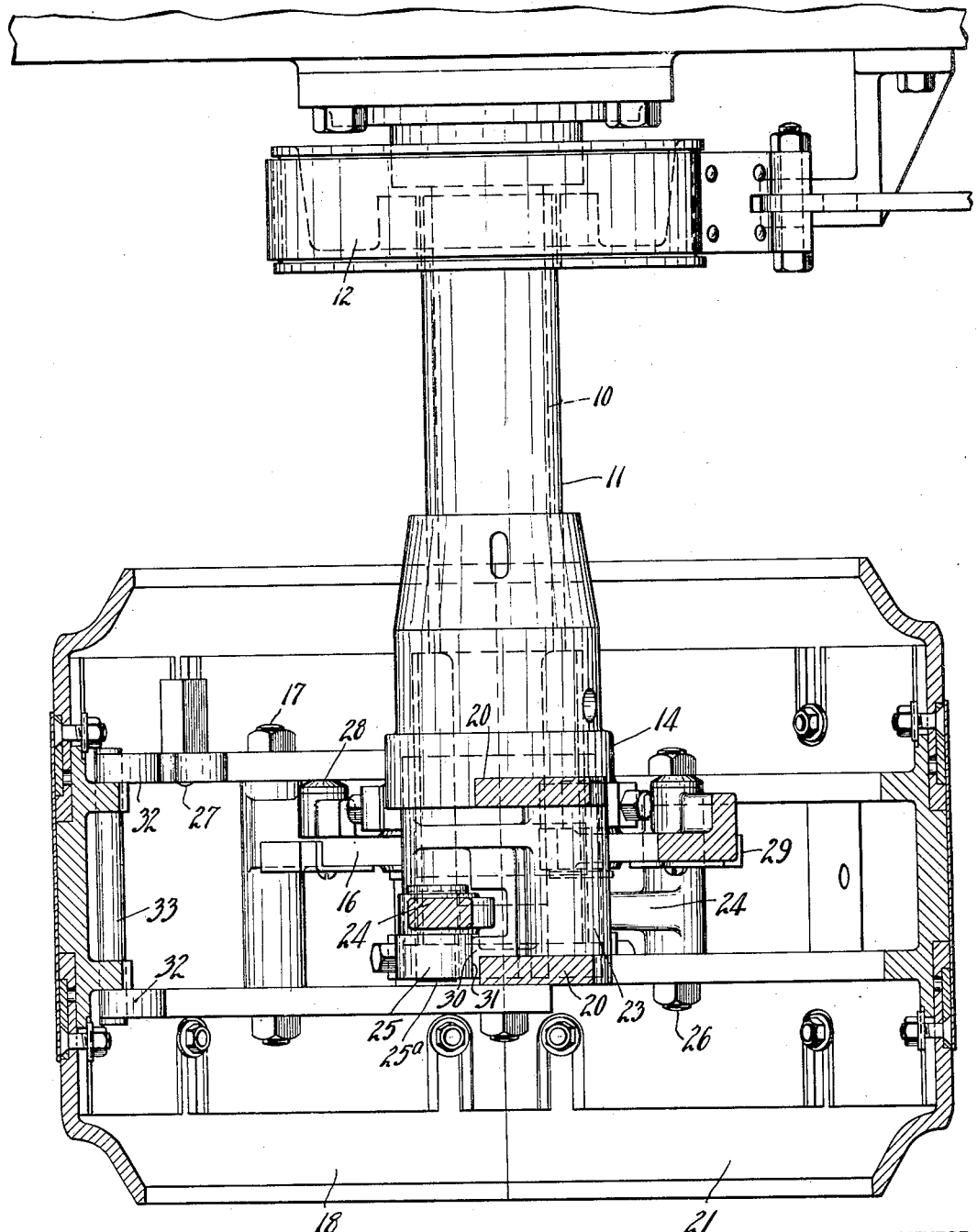

Feb. 6, 1934.  T. H. WILLIAMS  1,946,449
COLLAPSIBLE DRUM
Filed Oct. 24, 1932  6 Sheets-Sheet 4

INVENTOR
THOMAS H. WILLIAMS

BY Ely & Barrow

ATTORNEYS

Feb. 6, 1934.  T. H. WILLIAMS  1,946,449
COLLAPSIBLE DRUM
Filed Oct. 24, 1932  6 Sheets-Sheet 5
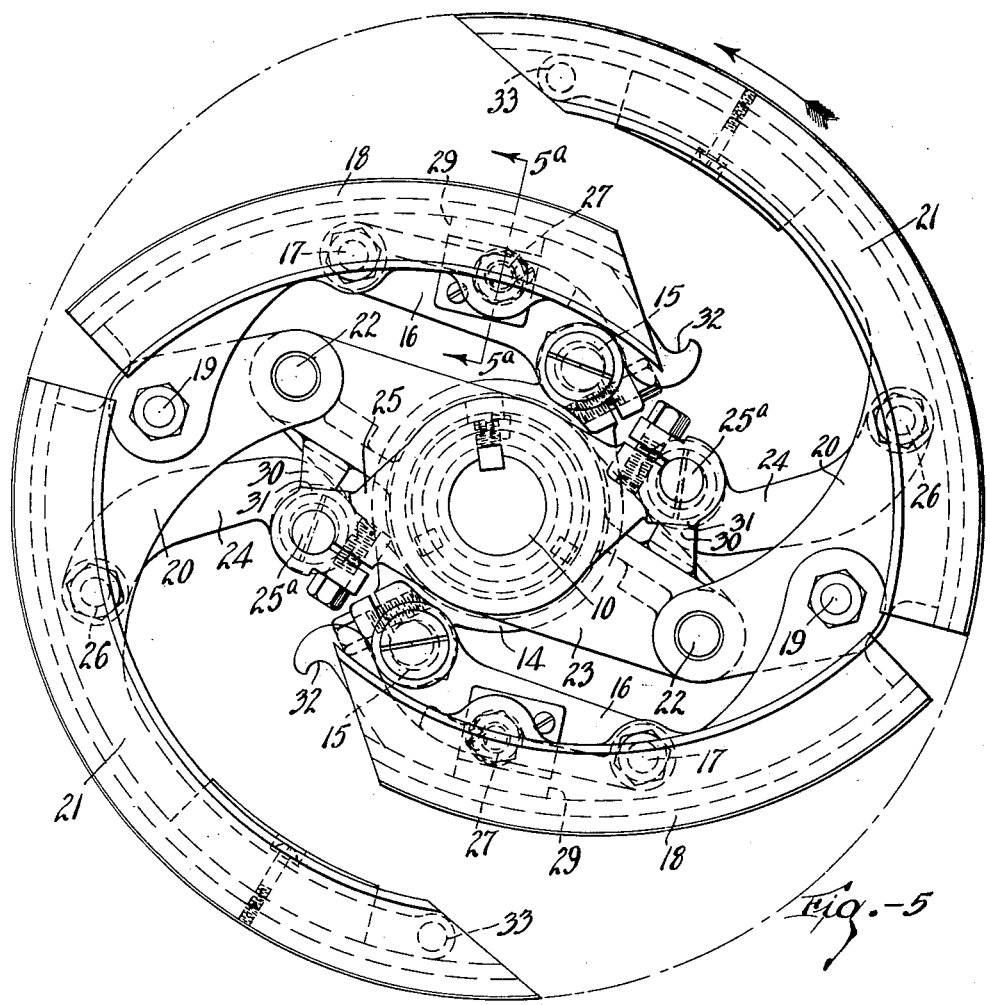
Fig.-5
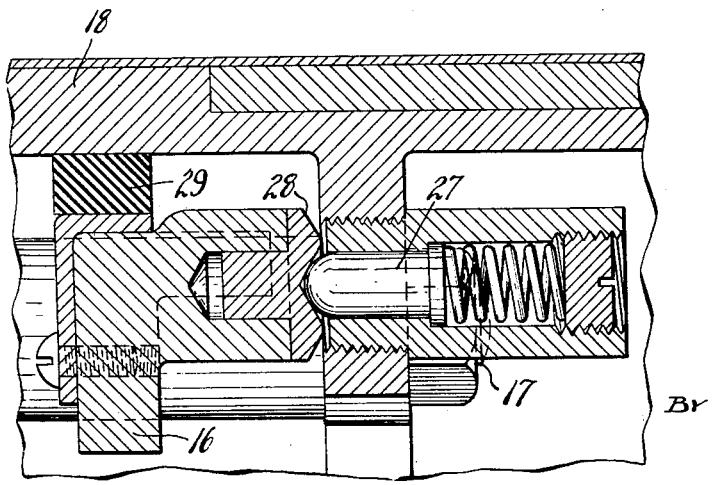
Fig.-5ª
INVENTOR
THOMAS H. WILLIAMS
By Ely & Barrow
ATTORNEYS

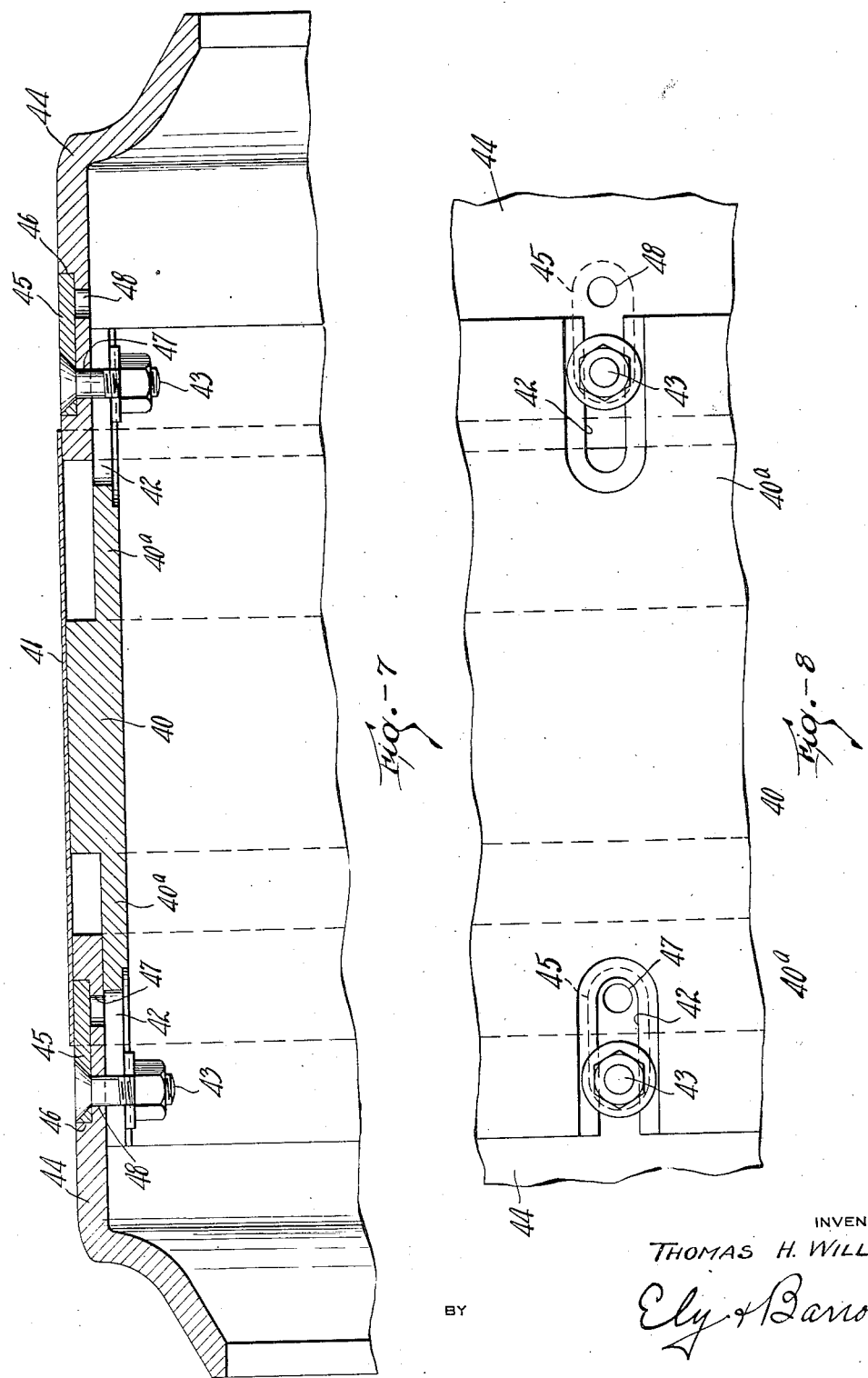

Patented Feb. 6, 1934

1,946,449

UNITED STATES PATENT OFFICE 1,946,449

COLLAPSIBLE DRUM

Thomas H. Williams, Akron, Ohio, assignor to National Rubber Machinery Company, Akron, Ohio, a corporation of Ohio Application October 24, 1932. Serial No. 639,159

16 Claims. (Cl. 154—9)

This invention relates to collapsible tire building forms.

The general purpose of the invention is to provide a tire building form capable of being collapsed to such extent as to permit easy removal of the tires, even those of large section and small bead diameter which are built upon deeply shouldered drums, and one which may be collapsed more easily, either manually or by power.

Heretofore collapsible drums have been provided of a type which includes opposed key sections which upon collapsing the drum are first moved inwardly and intermediate pivoted sections which are swung inwardly upon withdrawal of the key sections. These have been so constructed that the intermediate sections start inwardly before the first collapsing movement of the key sections is completed and also the swinging of the intermediate sections was so controlled that the free ends thereof had the maximum movement away from the tire at the start of the collapsing action during which the strong adhesion of the tacky stock of the tire to the drum is broken. Accordingly considerable force exerted suddenly upon the drum was required to pull the sections inwardly from the tire.

One particular purpose of the present invention is to provide a drum construction of the type described above in which the intermediate sections are so locked against contraction that the key sections are first moved inwardly to the limits of their first collapsing action before collapsing of the intermediate sections is initiated.

Another particular purpose of the invention is to provide means in a drum of the type required for causing the intermediate sections to "heel out" of the tire, that is, to cause the initial collapsing movement of the ends of the intermediate sections adjacent their pivots to be greater than that of the free ends of the intermediate sections whereby the force required for breaking the adhesion of the intermediate sections to the band is considerably reduced.

A further purpose of the invention is to provide an improved widthwise adjustable drum.

The foregoing and other purposes of the invention are attained in the collapsible drum illustrated in the accompanying drawings and described below. It is to be understood that the invention is not limited to the particular form thereof shown and described.

Of the accompanying drawings,

Figure 3 is a section on line 3—3 of Figure 1;

Figure 5 is a side elevation showing the key sections in their initially-collapsed positions;

Figure 5a is a section on line 5a—5a of Figure 5;

Figure 7 is an enlarged part radial section of the drum showing the widthwise adjustable features thereof; and Figure 8 is a view of part of the inner periphery of the drum showing said widthwise adjustable features.

Figure 1:
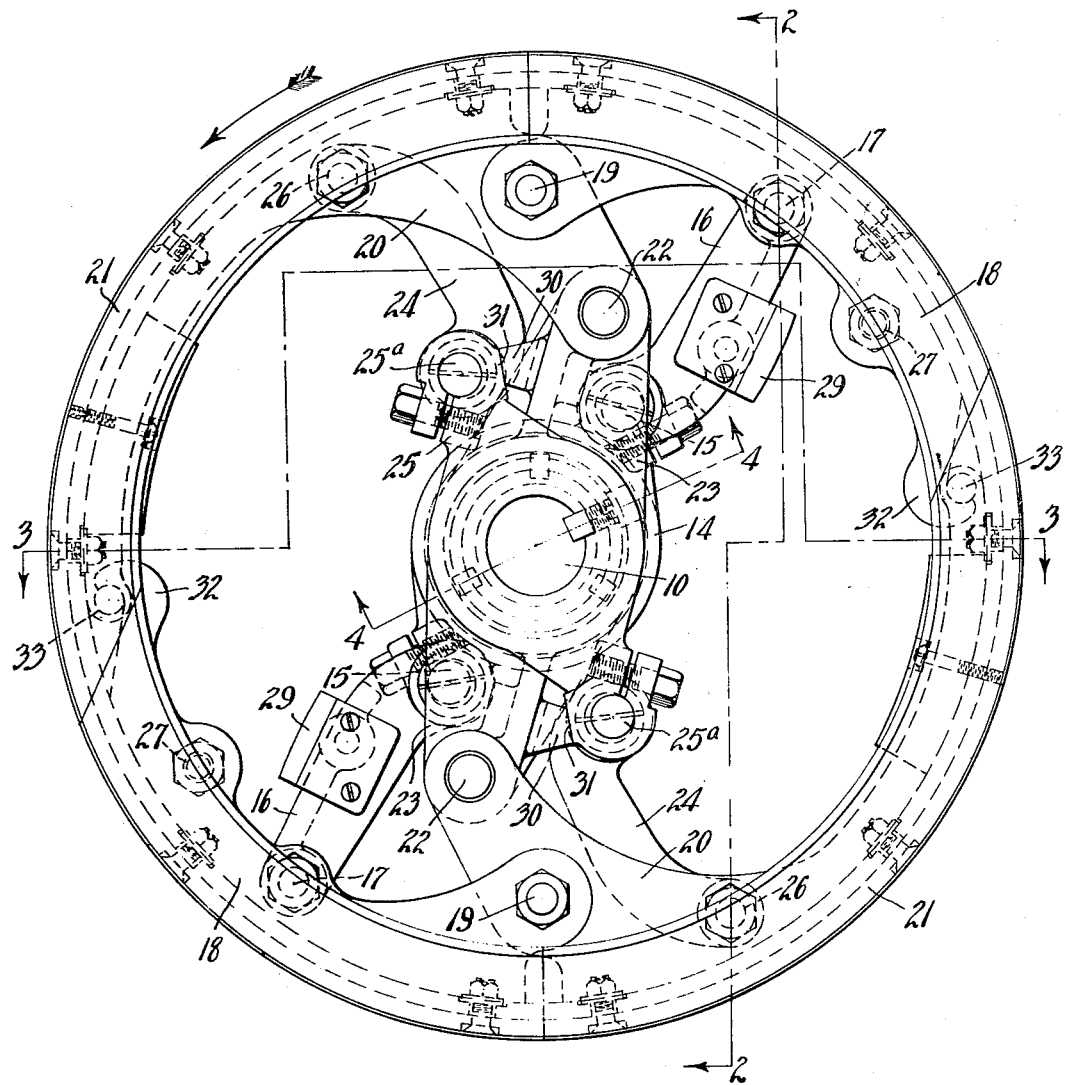
Figure 1 is a side elevation of a drum embodying the invention.
Figure 2:
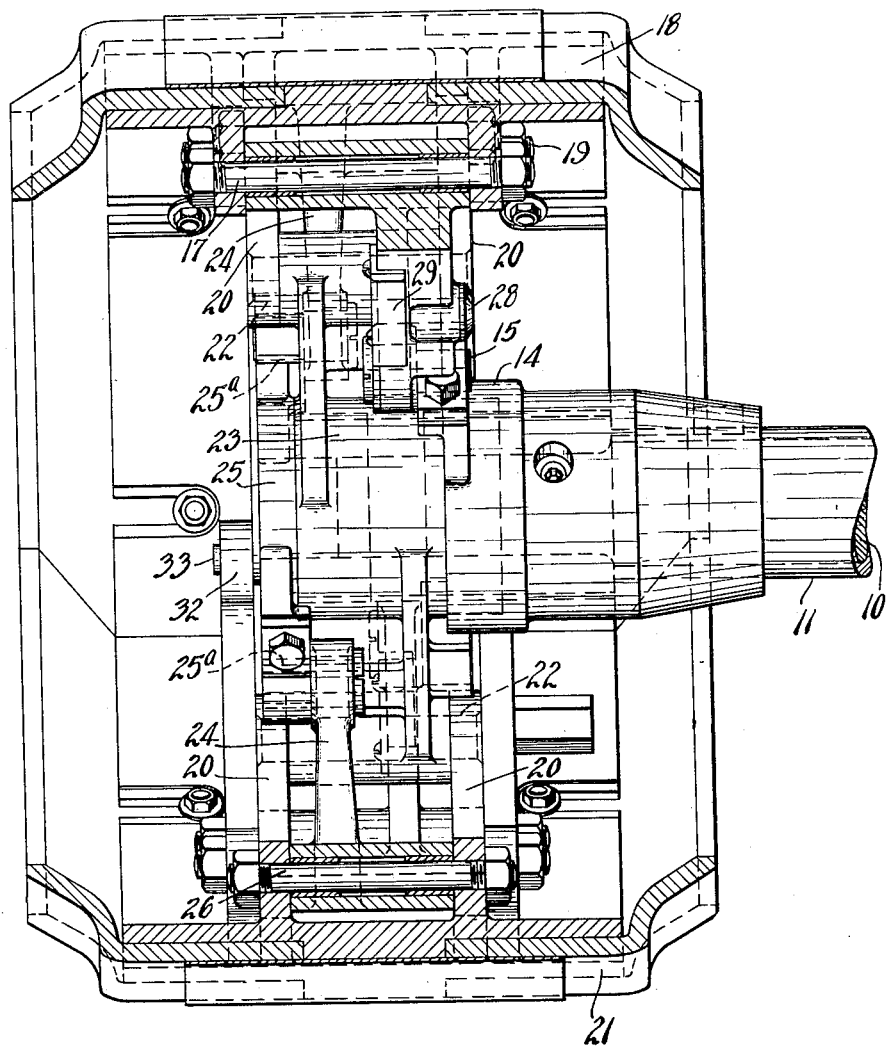
Figure 2 is a section on line 2—2 of Figure 1.

Referring to the drawings, the numeral 10 designates the shaft of a tire building machine which may be power driven by suitable means (not shown) and journaled on this shaft and rotatable relatively thereof is a sleeve or quill 11. Relative rotation between the shaft 10 and sleeve 11 may be produced manually, but such relative rotation is preferably produced by power as by the provision of means for causing the shaft and sleeve to rotate at different speeds. Suitable means for this purpose constitutes a brake 12 operable on the sleeve 11 in a manner which will be understood by skilled artisans, such means for collapsing drums by power being known in the art.

It will be understood that the collapsing means to be described in the succeeding paragraphs is operable by relative rotation of the shaft and sleeve. Consequently the parts herein shown attached to the shaft and sleeve may be suitably rearranged so that the parts shown attached to one may be attached to the other and vice versa.

In the drawings, a member 14 is attached to the sleeve 11 to rotate therewith and it has pivoted at diametrically opposite points 15, 15 thereon links 16, 16 which are pivotally connected at 17, 17 to key sections 18, 18 of the drum. The key sections 18 are pivoted at 19, 19 to arms 20, 20 secured to or integral with the intermediate sections 21, 21 of the drum, these sections being pivoted by arms 20 on pivots 22, 22 inwardly of pivots 19 upon a member 23 journaled on shaft 10, the pivots 22 being diametrically opposite each other. Links 24, 24 are pivoted to a member 25 at 25a, 25a and are pivotally connected to the intermediate sections 21 at 26, 26, whereby movement of sections 21 upon collapsing is controlled by the arms 20 and links 24 and relative movement of members 23 and 25 as will be described.

Figure 6:
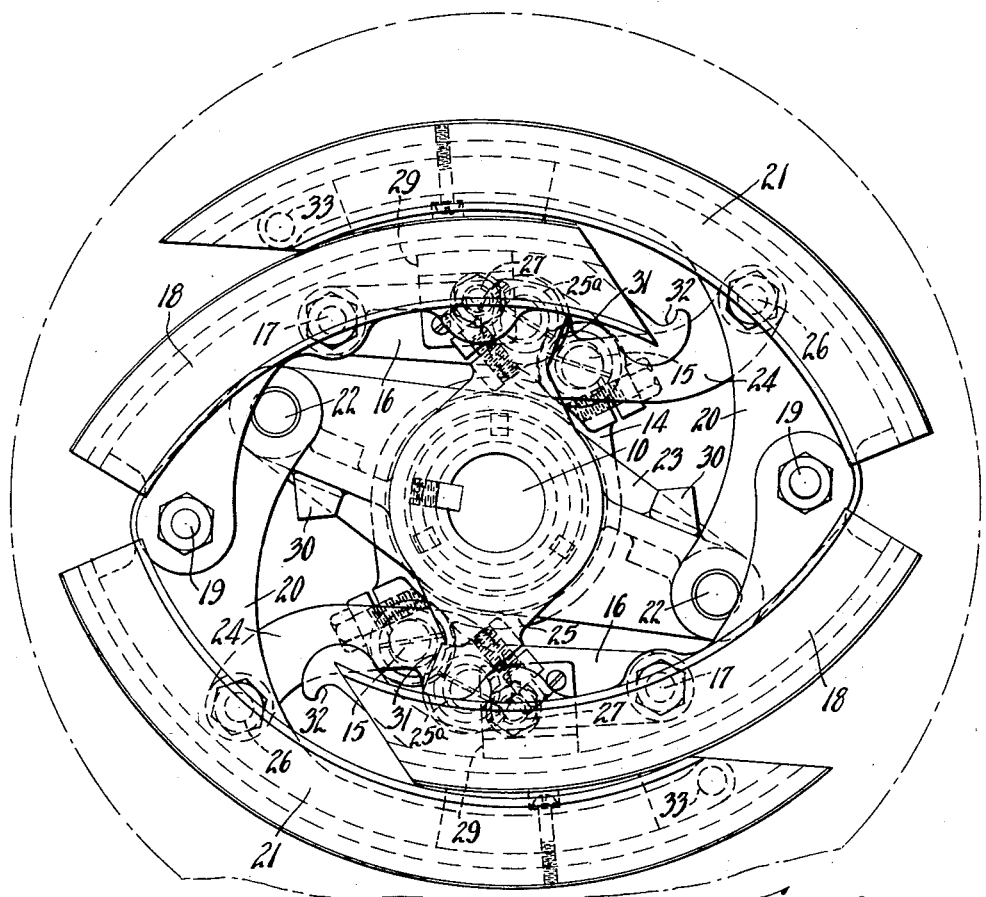
Figure 6 is a side elevation of the drum when completely collapsed.
Figure 4:
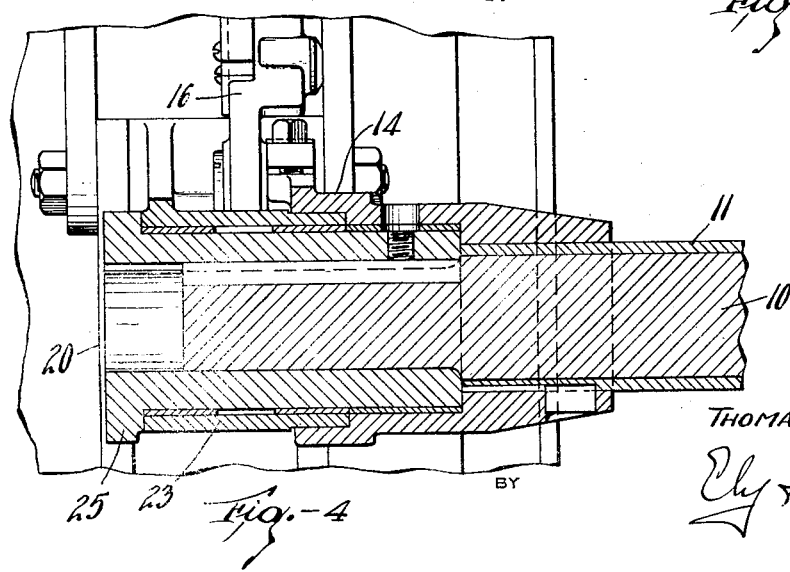
Figure 4 is a section on line 4—4 of Figure 1.

As best shown in Figures 1, 5, 5a and 6, the key sections 18 may carry spring pressed pins 27, 27 adapted to latch in socket members 28, 28 on links 16 when the key sections are collapsed and links 16 may also be provided with resilient bumpers or stops of rubber or other suitable material as at 29, 29 to limit collapsing movement of the key sections.

Abutments 30, 30 and 31, 31 may be provided respectively on members 23 and 25 to limit expanding movement of the intermediate sections 21. Key sections 18 may also be limited in expansion by hooks 32, 32 engaging pins 33, 33 on the free or "toe" ends of the intermediate sections 21.

In operation, to collapse the form relative rotation of sleeve 11 and shaft 10 is effected in one direction either manually or by spinning the drum by power rotation of the shaft and then applying the brake 12 or by other suitable power means for inducing relative rotation of the sleeve and shaft.

The initial action of collapsing caused by said relative rotation in one direction is to draw the key sections inwardly to the positions shown in Figure 5, this being accomplished by links 16, the pivots 15 of which remain relatively fixed while the drum moves counter-clockwise as shown in the drawings, arms 20 and links 24 rotating with the shaft, their normal relation when the drum is expanded being such as to lock members 23 and 25 against relative rotation.

When the key sections are fully collapsed, the continued relative rotation of shaft 10 respective to sleeve 11 causes a collapsing force to be applied through the pivots 15, links 16, collapsed key sections 18 and pivots 19 to the arms 20 causing pivots 22 to become relatively fixed respective to sleeve 11, pivots 25a continuing to move with shaft 10, i. e. causing relative movement of members 23 and 25, links 24 and arms 20 causing the collapsing movement in its initial stages to be greatest at the "heel" or end of the intermediate sections adjacent pivots 22. This movement is due to the arrangement and lengths of the linkages between pivots 22 and 19 and between pivots 25a and 26. The force being applied through pivots 19 breaks the locked compound toggle provided by member 23, arms 20 and links 24, which normally is slightly beyond a "dead center" position. The key sections and their operating links when the key sections are collapsed provide a rigid unit through which the collapsing forces are applied to the compound toggles to actuate the same.

The "heeling out" of the intermediate sections 21 under the guidance of the compound toggle through which the collapsing force is applied is highly advantageous in that the breaking of the adhesion between the intermediate sections and the tire proceeds progressively from adjacent the point of application of the collapsing force and the application of a sudden very heavy collapsing force is not required. The drum accordingly is collapsed smoothly with less jar and with a minimum of effort.

As shown in detail in Figures 7 and 8, the drum sections may each comprise a central member 40 on which may be secured a comparatively thin gap shield member 41, the member 40 having reduced extensions 40a, 40a, the edges of which are transversely notched as at 42, 42 to receive bolts 43, 43 for securing axially or widthwise adjustable shoulder members 44, 44 slidable on the reduced extensions 40a, the gap shield 41 bridging the gaps between the central member 40 and the shoulder members 44 in all positions of adjustment.

The bolts 43 are secured to plates 45, 45 adjacent one end of each plate and plates 45 fit in recesses 46, 46 in the outer surfaces of the adjustable shoulders 44, there being bolt holes 47 and 48 through the adjustable shoulder members in the recesses so located that the bolts 43 may be extended through either bolt hole by fitting the plates 45 in the recesses 46 in reversed positions as shown in Figures 7 and 8. By this means it is possible to increase the range of adjustment of the adjustable members 44 outwardly of the central member.

Modifications of the invention may be resorted to without departing from the spirit thereof within the scope of the appended claims.

What is claimed is:—

1. A tire building drum including three relatively rotatable central members, the first of said central members comprising a power driven shaft, the second central member comprising means controllable to effect relative rotation of the central members, and the third central member being intermediate the first two central members, said drum including radially collapsible, oppositely disposed key sections and radially collapsible, oppositely disposed intermediate sections, said key sections being pivotally connected to said intermediate sections, connections between the key sections and said second member for collapsing or expanding the key sections upon relative rotation of the second member and the first member, said intermediate sections being pivoted adjacent one end each to said intermediate central member, and connections between the intermediate sections and said second central members adjacent the pivoted ends of the intermediate sections normally locking the intermediate sections in expanded position, said intermediate sections being collapsible by the forces applied thereto through the key sections upon continued relative rotation of the first member and second member after the key sections have been collapsed, said second and third members relatively rotating during collapsing of the intermediate members whereby the aforesaid connections between the intermediate sections and the second and third members cause said intermediate sections to move more quickly away from the periphery of the drum at the start of the collapsing action at the ends thereof adjacent their pivots so as progressively to break the adhesion between the intermediate sections and the interior of a tire built upon the drum.

2. A tire building drum including three relatively rotatable central members, oppositely disposed key sections radially collapsible, oppositely disposed intermediate sections also radially collapsible, said key sections being pivoted to the intermediate sections, said intermediate sections being pivoted at their ends adjacent the key section pivots to one central member, connections from the key sections to another central member, and connections from the intermediate sections to a third central member, said key sections being collapsible upon relative rotation of the second named central member respective to the first-named and third-named central members, said intermediate sections being collapsible after collapsing of the first key section by continuance of said relative rotation, the forces of which are applied to the intermediate sections through the key sections and which induce relative rotation of the first-named and third-named central members, said connections to the intermediate sections being such that said intermediate sections are caused at the start of their collapsing movement to collapse more quickly away from the interior of a tire built thereon at their pivoted ends.

3. A tire building drum including three relatively rotatable central members, oppositely disposed key sections radially collapsible, oppositely disposed intermediate sections also radially collapsible, said key sections being pivoted to the intermediate sections, said intermediate sections being pivoted at their ends adjacent the key section pivots to one central member, connections from the key sections to another central member, and connections from the intermediate sections to a third central member, said key sections being collapsible upon relative rotation of the second named central member respecting the first-named and third-named central members, said intermediate sections being collapsible after collapsing of the first key section by continuance of said relative rotation, the forces of which are applied to the intermediate sections through the key sections and which induce relative rotation of the first-named and third-named central members.

4. A collapsible tire building drum comprising, oppositely disposed key sections, oppositely disposed intermediate sections and three central members rotatable in unison for supporting and rotating the drum and rotatable relatively for collapsing or expanding the drum, said intermediate sections being pivotally connected at one end of each to one central member and said key sections being pivotally connected to said intermediate sections adjacent the pivoted ends of the intermediate sections, connections from a second central member to the key sections for first collapsing the same upon a relative rotation of said second central member respecting the other central members, and connections from a third central member to the intermediate sections whereby upon continued application of the collapsing force after collapse of the key sections relative rotation of the first and third central members will be induced to collapse the intermediate sections.

5. A collapsible tire building drum comprising, oppositely disposed key sections, oppositely disposed intermediate sections and three central members rotatable in unison for supporting and rotating the drum and rotatable relatively for collapsing or expanding the drum, said intermediate sections being pivotally connected at one end of each to one central member and said key sections being pivotally connected to said intermediate sections adjacent the pivoted ends of the intermediate sections, connections from a second central member to the key sections for first collapsing the same upon a relative rotation of said second central member respecting the other central members, and connections from a third central member to the intermediate sections whereby upon continued application of the collapsing force after collapse of the key sections relative rotation of the first and third central members will be induced to collapse the intermediate sections, the connections from the third central member to the intermediate sections being such as to cause the collapsing movement of the pivoted ends of the intermediate sections at the start of their collapsing movement to be faster than that of the ends of the intermediate sections remote from the pivots.

6. A collapsible tire building form comprising oppositely disposed key sections, oppositely disposed intermediate sections, one key section being hingedly connected to the intermediate sections adjacent one end of each intermediate section, means for collapsing the drum connected to the key section for first swinging the key sections inwardly of the drum, and means for swinging the intermediate sections inwardly of the drum, said last-named means being operable to swing the pivoted ends of the intermediate sections inwardly of the drum faster than the free ends thereof at the start of their inward movement, said last-named means including a compound toggle operable through the pivotal connections of the key sections to the intermediate sections by said collapsing means, and normally locked to prevent collapsing of the intermediate sections until the key sections have been collapsed.

7. A collapsible tire building form comprising oppositely disposed key sections, oppositely disposed intermediate sections, one key section being hingedly connected to the intermediate sections adjacent one end of each intermediate section, means for collapsing the drum connected to the key section for first swinging the key sections inwardly of the drum, and means for swinging the intermediate sections inwardly of the drum, said last-named means being operable to swing the pivoted ends of the intermediate sections inwardly of the drum faster than the free ends thereof at the start of their inward movement, said last-named means including a compound toggle operable through the pivotal connections of the key sections to the intermediate sections by said collapsing means.

8. A collapsible tire building form comprising oppositely disposed key sections, oppositely disposed intermediate sections, one of said key sections being pivotally connected at one end to each of said intermediate sections adjacent one end of each, means for supporting and collapsing the form, said intermediate sections being pivoted to said means, connections from the key sections to said means for collapsing the key sections, and connections from the intermediate sections to said means for collapsing the intermediate sections, said collapsing means and the connections of the intermediate sections being so arranged as to cause the pivoted ends of the intermediate sections to move inwardly at a greater rate than the free ends thereof at the start of their collapsing movement.

9. A collapsible tire building form including oppositely disposed key sections, oppositely disposed intermediate sections, means centrally of the form for supporting, rotating and collapsing and expanding the form, said means including connections to the intermediate sections comprising compound toggles and connections to the key sections, one of said key sections being hinged to each intermediate section, the connections to the key sections being operable to swing the key sections inwardly to start the collapse of the form and being operable through the key sections to contract said compound toggles to complete the collapse of the form, said compound toggles so controlling movement of the intermediate sections as to cause more rapid movement of the ends thereof adjacent their pivots than the ends remote therefrom at the start of their collapsing movement.

10. A collapsible tire building form including oppositely disposed key sections, oppositely disposed intermediate sections, means centrally of the form for supporting, rotating and collapsing and expanding the form, said means including connections to the intermediate sections, and connections to the key sections, one of said key sections being hinged to each intermediate section, the connections to the key sections being operable to swing the key sections inwardly to start the collapse of the form and being operable through the key sections to complete the collapse of the form, said connections to the intermediate sections so controlling movement of the intermediate sections as to cause more rapid movement of the ends thereof adjacent their pivots than the ends remote therefrom at the start of their collapsing movement.

11. A collapsible tire building form comprising oppositely disposed key sections and oppositely disposed intermediate sections hinged together in pairs, means for supporting and rotating and collapsing and expanding the form, said means including connections to the key sections for first partly collapsing the same and then upon a continued collapsing movement of the key sections to apply collapsing forces to the intermediate sections through the hinges of the sections, and connections to the intermediate sections for supporting and guiding the same in their collapsing movement.

12. A collapsible tire building form comprising oppositely disposed key sections and oppositely disposed intermediate sections hinged together in pairs, means for supporting and rotating and collapsing and expanding the form, said means including connections to the key sections for first collapsing the same and then through the key sections to apply collapsing forces to the intermediate sections, and connections to the intermediate sections for supporting and guiding the same in their collapsing movement, said connections being operable to effect more rapid movement of the heels than the toes of the intermediate sections at the start of their collapsing movement.

13. A collapsible tire building form comprising oppositely disposed key sections and oppositely disposed intermediate sections hinged together in pairs, means for supporting and rotating and collapsing and expanding the form, said means including connections to the key sections for the first partly collapsing the same and then upon a continued collapsing of the key sections to apply collapsing forces to the intermediate sections through the hinges of the sections, and connections to the intermediate sections for supporting and guiding the same in their collapsing movement, said last-named connections being adapted to lock in their positions in the expanded form to prevent collapsing movement thereof until the key sections have been collapsed to predetermined positions.

14. A collapsible tire building form comprising oppositely disposed key sections and oppositely disposed intermediate sections hinged together in pairs, means for supporting and rotating and collapsing and expanding the form, said means including connections to the key sections for first collapsing the same and then through the key sections to apply collapsing forces to the intermediate sections, connections to the intermediate sections for supporting and guiding the same in their collapsing movement, said last-named connections being adapted to lock in their positions in the expanded form to prevent collapsing movement thereof until the key sections have been collapsed, and means limiting collapsing movement of the key sections whereby the collapsing force applied thereto will be applied to the intermediate sections after movement of said key sections is limited to release said locked connections.

15. A widthwise adjustable tire building form including a central member and axially adjustable shoulder members on the sides thereof, said central member having reduced extensions on which said side members telescope, and means adjustably connecting the central members to the side members comprising plates fitted in recesses in the outer surfaces of the side members, said plates having bolts secured adjacent one end thereof and bolt holes extending through said side members in opposite ends of said recesses for receiving said bolts in reversed positions of said plates in said recesses, said bolt holes being in alignment with axially elongated openings in the extensions from the central member through which the bolts extend to secure the side members in adjusted positions to the central member.

16. A widthwise adjustable tire building form comprising one member formed with a reduced extension, another member telescoping on said extension, the first member having an axially elongated bolt receiving opening therein, and the second member having a recess in its outer surface in alignment with said opening, a plate fitting in said recess and having a bolt secured adjacent one end thereof, said recess having bolt holes therein to receive said bolt in reversed positions of said plate in said recess, said bolt extending through said telescopically adjustable member and through said elongated opening in said extension to secure the members together in adjusted positions.

THOMAS H. WILLIAMS.